US012678995B2

(12) United States Patent
Pryor et al.

(10) Patent No.: US 12,678,995 B2
(45) Date of Patent: Jul. 14, 2026

(54) SEALANT SPREADER DEVICE FOR USE IN FILLING VOIDS IN PREPARED HOLES FOR GLUED-IN-ROD STRUCTURES

(71) Applicant: Simpson Strong-Tie Company Inc., Pleasanton, CA (US)

(72) Inventors: Steven E. Pryor, Carson City, NV (US); Emory L. Montague, Pleasanton, CA (US); Guy T. Anderson, Ashland, OR (US); Quentin Hibben, Elburn, IL (US); Corey Clark, Hendersonville, TN (US); Marlou Rodriguez, Naperville, IL (US); Randy Daudet, Richland, WA (US); Robert Leichti, Bend, OR (US); Paul McEntee, Fremont, CA (US); Michael Wesson, Elk Grove, CA (US); Donald Weems, Manteca, CA (US); Von Yang, Stockton, CA (US)

(73) Assignee: SIMPSON STRONG-TIE COMPANY INC., Pleasanton, CA (US)

( * ) Notice: Subject to any disclaimer, the term of this patent is extended or adjusted under 35 U.S.C. 154(b) by 0 days.

(21) Appl. No.: 17/961,018

(22) Filed: Oct. 6, 2022

(65) Prior Publication Data

US 2024/0116207 A1 Apr. 11, 2024

(51) Int. Cl.
*B27G 11/00* (2006.01)
*B05C 17/10* (2006.01)
*B05D 5/10* (2006.01)

(52) U.S. Cl.
CPC .............. *B27G 11/00* (2013.01); *B05C 17/10* (2013.01); *B05D 5/10* (2013.01)

(58) Field of Classification Search
CPC ...... F16B 11/006; F16B 12/04; F16B 13/141; F16B 13/142; B01F 27/1123
(Continued)

(56) References Cited

U.S. PATENT DOCUMENTS 2,896,925 A * 7/1959 Place .................. B01F 27/1153 416/201 A
3,333,311 A * 8/1967 Matheny ............. B28B 19/0023 15/104.18
(Continued)

FOREIGN PATENT DOCUMENTS

CA 3040639 4/2018
CN 1126265 7/1996
(Continued)

OTHER PUBLICATIONS

International Search Report and Written Opinion dated Jan. 25, 2024 in International Patent Application No. PCT/US2023/074252.
(Continued)

*Primary Examiner* — Karl Kurple
(74) *Attorney, Agent, or Firm* — Pearl Cohen Zedek Latzer Baratz LLP

(57) ABSTRACT

A sealant spreader device fills voids around a drilled hole with sealant in glued-in-rod (GIR) structures. A liquid sealant may be applied to the base of a drilled hole. A sealant spreader device is then inserted to the base of the drilled hole, through the sealant. The sealant spreader device is then withdrawn while rotating. The sealant spreader device includes winged sections having contours which force the sealant radially outward toward walls of the hole, into any voids around the circumference of the drilled hole, and leaves a thin layer of sealant around the circumference of the drilled hole.

11 Claims, 18 Drawing Sheets

(58) Field of Classification Search
USPC ....................................... 366/310, 312, 330.1
See application file for complete search history.

(56) References Cited

U.S. PATENT DOCUMENTS

| | | | | |
|---|---|---|---|---|
| 3,359,742 | A | 12/1967 | Blatter | |
| 3,394,450 | A * | 7/1968 | Gill | B21C 37/09 427/195 |
| 3,470,265 | A * | 9/1969 | Sprow | C07C 2/62 416/197 R |
| 3,491,721 | A * | 1/1970 | Larson | B05B 5/12 29/430 |
| 4,054,272 | A * | 10/1977 | Cooke | B01F 27/0724 D15/147 |
| 4,115,178 | A | 9/1978 | Cone et al. | |
| 4,252,763 | A * | 2/1981 | Padgett | B05B 3/02 264/269 |
| 4,294,869 | A * | 10/1981 | Bassompierre-Sewrin | B05C 7/08 427/232 |
| 4,308,824 | A * | 1/1982 | Muta | B29C 48/50 118/713 |
| 4,472,063 | A * | 9/1984 | Eickelmann | B01F 27/114 366/310 |
| 4,509,884 | A | 4/1985 | Trout et al. | |
| 5,019,417 | A * | 5/1991 | Northcutt | F16L 55/1645 427/508 |
| 5,257,486 | A * | 11/1993 | Holmwall | E04G 23/0211 52/742.16 |
| 5,259,686 | A * | 11/1993 | Hatch | F16B 11/006 403/267 |
| 5,429,706 | A * | 7/1995 | Cresse | B29C 63/20 156/356 |
| 6,598,499 | B1 * | 7/2003 | Ernst | B25B 13/5008 81/53.2 |
| D485,654 | S * | 1/2004 | Clark | D32/26 |
| 6,837,018 | B1 * | 1/2005 | Hagel | E04G 23/0207 411/930 |
| 6,871,681 | B2 * | 3/2005 | Miller | F16B 11/008 144/353 |
| 9,322,239 | B2 * | 4/2016 | Angeles Boza | E21B 23/14 |
| 2010/0115882 | A1 * | 5/2010 | Seroiszka | F16B 5/01 411/82.1 |
| 2010/0209606 | A1 * | 8/2010 | Munden | B08B 9/0551 427/230 |
| 2012/0263522 | A1 * | 10/2012 | Breyer | C09J 161/06 403/294 |
| 2020/0056368 | A1 | 2/2020 | Adachi | |
| 2021/0025436 | A1 * | 1/2021 | Gerber | F16B 37/122 |

FOREIGN PATENT DOCUMENTS

| | | |
|---|---|---|
| CN | 108162519 | 6/2018 |
| CN | 109013166 | 12/2018 |
| CN | 109898670 | 6/2019 |
| CN | 110669897 | 1/2020 |
| EP | 0476638 | 3/1992 |
| JP | 05272126 | 10/1993 |
| JP | 2013226680 | 11/2013 |
| JP | 2017128025 | 7/2017 |
| WO | 2020146210 | 7/2020 |

OTHER PUBLICATIONS

English language Abstract for JP05272126 published Oct. 19, 1993.
Examination Report dated Apr. 24, 2025 in New Zealand Application No. 803798.
Notice of Acceptance dated Apr. 30, 2025 in Australian Application No. 2022246681.
Examination Report dated Aug. 16, 2024 in Australian Patent Application No. 2022246681.
Office Action dated Nov. 12, 2024 in Japanese Patent Application No. 2023-560637.
Restriction Requirement dated Mar. 1, 2024 in U.S. Appl. No. 17/711,466.
Response to Communication Pursuant to Rules 161(1) and 162 EPC dated May 24, 2024 in European Patent Application No. 22725313.5.
Office Action dated Jul. 16, 2024 in U.S. Appl. No. 17/711,466.
Examiner's Report dated Jan. 16, 2025 in Canadian Application No. 3,214,804.
Response to Final Office Action dated Jun. 20, 2025 in U.S. Appl. No. 17/711,466.
Response to Office Action filed Dec. 18, 2024 in U.S. Appl. No. 17/711,466.
Final Office Action dated Mar. 20, 2025 in U.S. Appl. No. 17/711,466.
Notice of Allowance dated Mar. 25, 2025 in Japanese Patent Application No. 2023-560637.
Response to Restriction Requirement dated May 1, 2024 in U.S. Appl. No. 17/711,466.
English language Abstract for JP2017128025 published Jul. 27, 2017.
English language Abstract for CN108162519 published Jun. 15, 2018.
English language Abstract for CN109898670 published Jun. 18, 2019.
English language Abstract for JP2013226680 published Nov. 7, 2013.
International Search Report and Written Opinion dated Jul. 1, 2022 in International Patent Application No. PCT/US2022/023077.
English language Abstract for EP0476638 published Mar. 25, 1992.
Office Action dated Apr. 11, 2026 in Chines Patent Application No. 202380079673.8.

* cited by examiner

SEALANT SPREADER DEVICE FOR USE IN FILLING VOIDS IN PREPARED HOLES FOR GLUED-IN-ROD STRUCTURES

BACKGROUND

Glued-In-Rod (GIR) systems are known where a rod is glued into a hole that is drilled in wood. This wood may be solid sawn or composed of an engineered wood product, such as for example structural composite lumber (SCL) or cross laminated timber (CLT). In GIR, when glue is injected into the drilled hole to embed the rod, the glue leaks into voids in the wood around the drilled hole. The leakage of glue prevents enough glue at the interface between the wood and rod for a secure bond.

DETAILED DESCRIPTION

Figure 1:
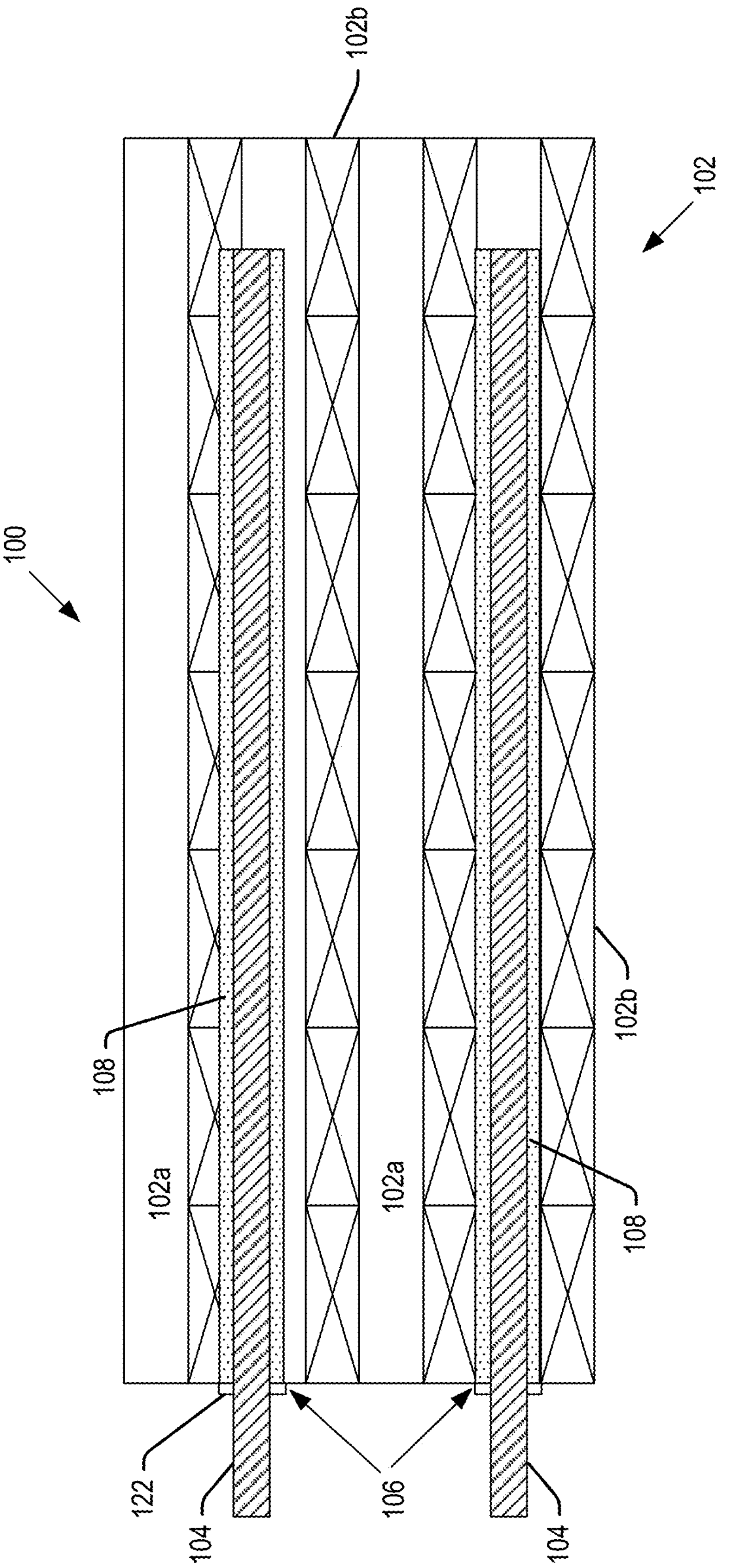
FIG. 1 is a front cross-sectional view of a section of lumber such as cross laminated timber including rods glued in according to embodiments of the present technology.

The present technology, roughly described, relates to a sealant spreader device for filling voids around a drilled hole with sealant in glued-in-rod (GIR) structures. In wood structures, such as natural or engineered wood products, the wood may have voids. In natural lumber, the voids may exist in the grain of the wood. In engineered wood products, such as cross laminated timber, the voids may exist in the grain of the wood and/or where the pieces of timber are affixed to each other. In accordance with the present technology, before gluing a rod into a drilled hole, a sealant may be applied to the hole and forced into the voids around the circumference of the hole using the sealant spreader devices of the present technology. The sealant spreader devices of the present technology may be attached to or include a rod. A sealant spreader device may be affixed to one end of the rod, and the opposite end of the rod may be fit into a drill to rotate the rod and sealant spreader device.

In operation, a liquid sealant is applied to the base (bottom) of a drilled hole. The amount of sealant depends on the depth and diameter of the drilled hole. Thereafter, a sealant spreader device (typically abbreviated SSD herein) on the rod is inserted to the base of the drilled hole, through the sealant. The SSD is then withdrawn while rotating. The sealant spreader device includes winged sections having contours which force the sealant radially outward toward walls of the hole, into any voids around the circumference of the drilled hole, and leaves a thin layer of sealant around the circumference of the drilled hole.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±2.5%.

For purposes of this disclosure, a connection may be a direct connection or an indirect connection (e.g., via one or more other parts). In some cases, when a first element is referred to as being connected, affixed, mounted or coupled to a second element, the first and second elements may be directly connected, affixed, mounted or coupled to each other or indirectly connected, affixed, mounted or coupled to each other. When a first element is referred to as being directly connected, affixed, mounted or coupled to a second element, then there are no intervening elements between the first and second elements (other than possibly an adhesive or melted metal used to connect, affix, mount or couple the first and second elements).

Referring initially to FIG. 1, there is shown a front cross-sectional view of a GIR structure 100 comprised of wood 102 in which rods 104 have been glued into drilled holes 106 using an adhesive 108. In embodiments that follow, the wood shown is cross laminated timber (CLT). However, it is understood that the embodiments of the sealant spreader device for filling voids in GIR structures may be used with any type of wood or lumber. In the illustrated embodiments, the wood 102 may be CLT, including layers 102*a* of planks affixed together and extending in a first direction (left to right in FIG. 1), and layers 102*b* of planks affixed together and extending in a second direction (into the page of FIG. 1). There may be multiple layers 102*a* and 102*b* interspersed with each other. The number of layers, the directionality of each layer, the thickness of each layer, and the number of planks in each layer, are shown by way of example only and each may vary in further embodiments. The number of rods 104 is also shown by way of example and may vary in further embodiments.

Figure 2:
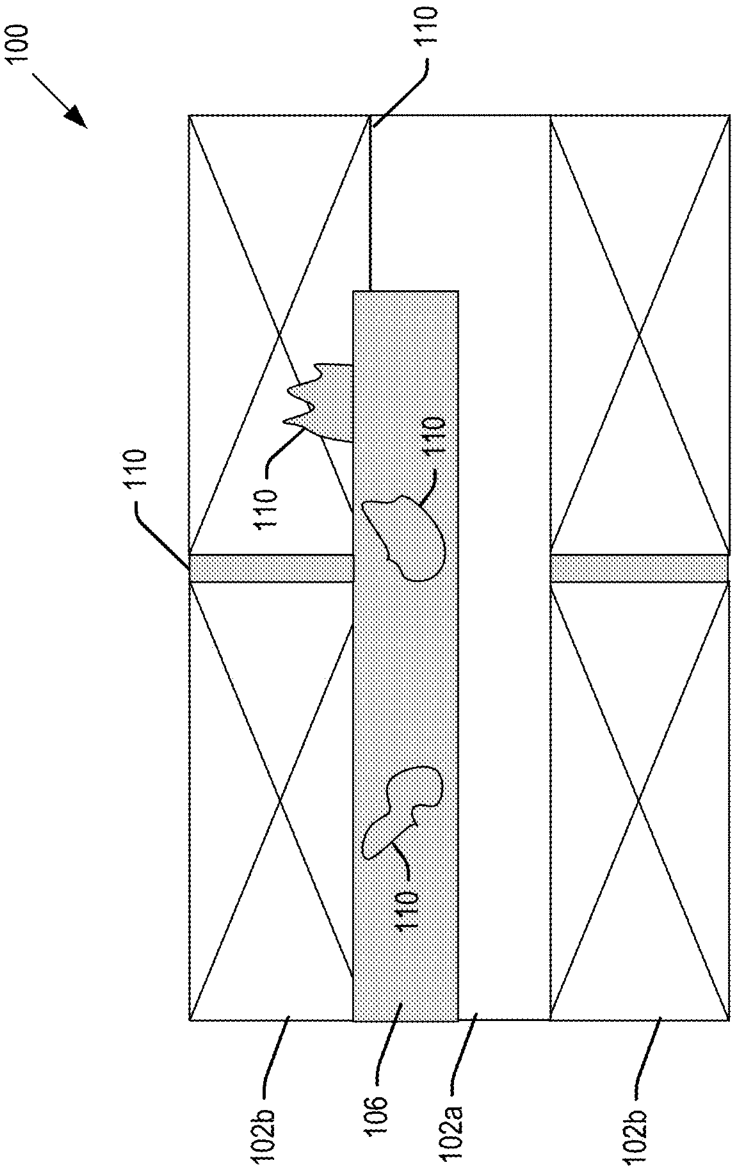
FIG. 2 shows an enlarged front cross-sectional view of a section of lumber such as cross laminated timber including rods glued in according to embodiments of the present technology.

As noted in the Background section, before the rods 104 are inserted into the drilled holes 106, the holes are prepared with a sealant to fill any voids in the drilled holes. FIG. 2 shows an enlarged section of the GIR structure 100 showing a portion of a layer 102*a* sandwiched between a portion of a pair of layers 102*b*. A drilled hole 106 is shown through layers of the wood 102, which drilled hole 106 is open to voids 110 around a circumference of the drilled hole 106. These voids 110 may be naturally occurring in the layers 102*a*, 102*b* and/or may occur where planks in a layer are not quite directly affixed to each other. The number, type and appearance of the voids 110 is shown by example and will vary in different embodiments.

Figure 3:
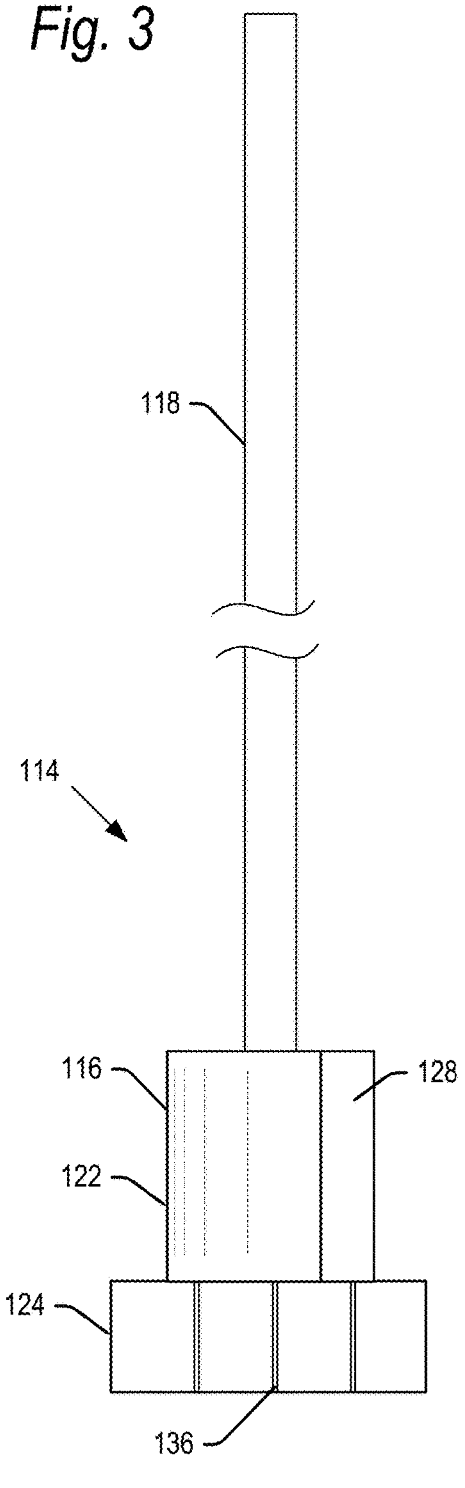
FIG. 3 is a front view of a sealant spreader assembly according to embodiments of the present technology.

FIGS. 3-8 show a first embodiment of a sealant spreader assembly 114 for preparing a drilled hole 106 with a layer of sealant. As seen in FIG. 3, a sealant spreader assembly 114 includes a sealant spreader device 116 affixed to a first end of a rod 118. A device such as a drill (not shown) may be removably affixed to the second end of rod 118 to rotate the SSD 116 and rod 118. Instead of a drill, a key, crank or some other instrument may fit over the second end of rod 118 to allow manual rotation of the SSD 116 and rod 118.

Figure 4:
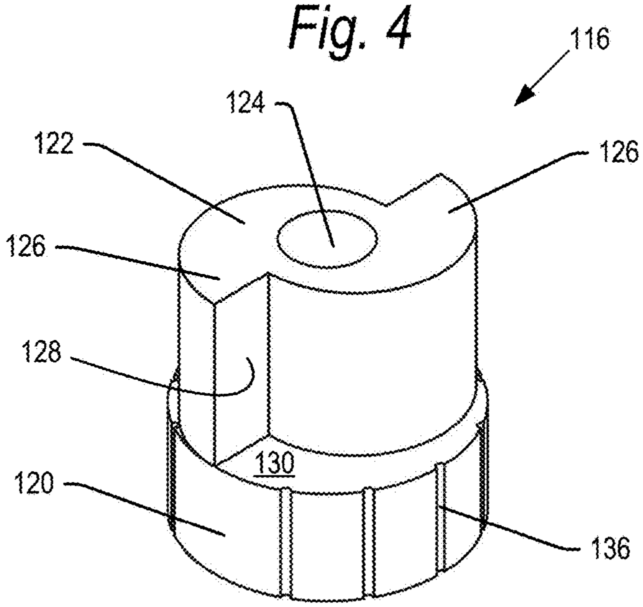
FIGS. 4 and 5 are different perspective views of a sealant spreader device according to the embodiment of FIG. 3.
Figure 5:
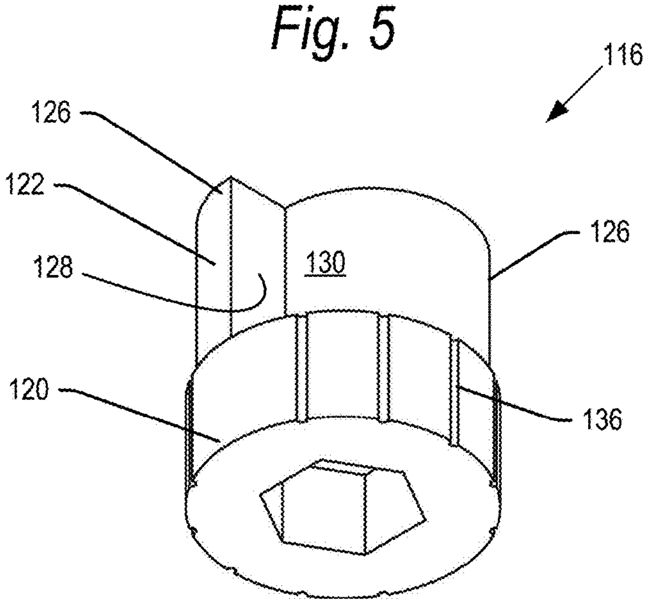

As seen in FIGS. 3-5, the SSD 116 may have a cylindrical base portion 120 and a top portion 122 including a central aperture 124 for receiving rod 118, and pair of winged sections 126. Each winged section 126 may extend 180° around a central axis of top portion 122. A radius of each winged section 126 begins at a minimal radius at 0°, and increases to a maximum radius at 180°, which maximum radius matches a radius of the base portion 120. The maximum radius portion of the first winged section 126 meets the minimum radius portion of the second winged section 126 at a face 128. The area above the base portion 120 adjacent the faces 128 and minimal radius portions of the winged sections 126 define a reservoir 130 for storing sealant as explained below.

The base portion 120 may be integrally formed with the top portion 122, for example in an additive manufacturing process. The base portion 120 may be separate from and affixed to the top portion 122, and the sealant spreader device 116 may be made by other methods, in further embodiments. The base portion 120 and top portion 122 may be formed of a rigid material such as for example a plastic or other polymer. In further embodiments, the base portion 120 and/or top portion 122 may be formed of a flexible or pliable material such as for example rubber.

Figure 6:
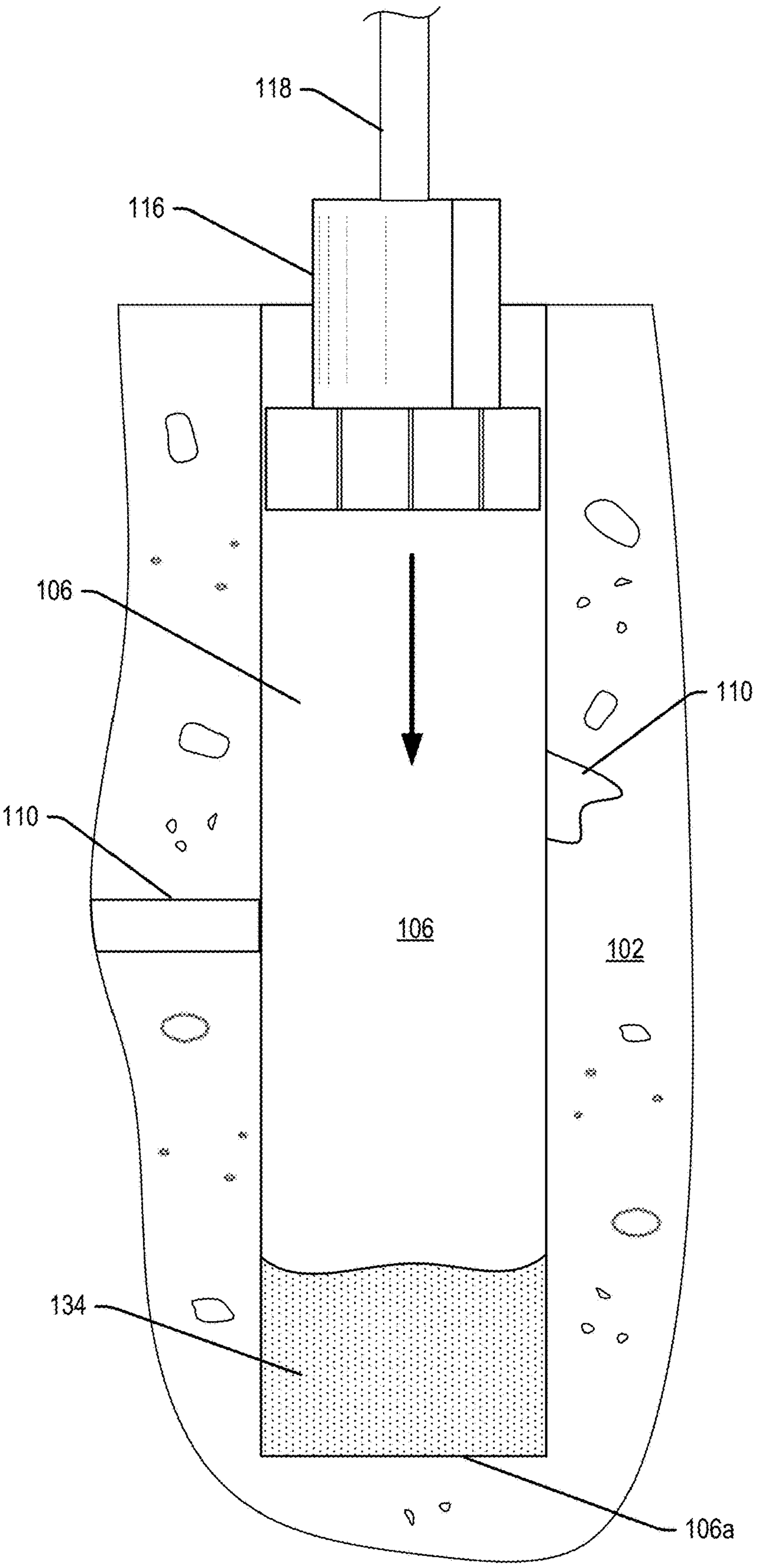
FIGS. 6-8 are views of a sealant spreader being inserted into and removed from a hole according to embodiments of the present technology.

FIG. 6 is a cross-sectional view of a portion of a drilled hole 106 in wood 102. Voids 110 are shown connecting to the circumference of the drilled hole 106. Again, the voids 110 shown are by way of example only and will vary in further embodiments. In order to fill the voids 110 in preparation to receiving a glued in rod 104 (FIG. 1), a sealant 134 is initially supplied to a base or bottom 106*a* of the drilled hole 106. The sealant 134 may be any of various viscous fluids or pastes such as for example CI-GV adhesive from Simpson-Strong-Tie, headquartered in Pleasanton, CA. The sealant 134 may be supplied to the base 106*a* of hole 106 for example by being injected through a tube (not shown) which extends from outside the hole 106 to the base 106*a* of hole 106. The amount of sealant 134 supplied to the base 106*a* depends on the depth and diameter of the hole 106. In embodiments, the amount of sealant 134 used is sufficient to seal any voids open to the hole 106 and to leave a thin layer of sealant along the entire cylindrical surface of hole 106.

As shown in FIG. 6, once the sealant 134 is in the base 106*a* of hole 106, the SSD 116 may be inserted into the hole 106. The SSD 116 may be customized to the hole 106. In particular, the diameter of the base portion 120 and the maximum diameters of the winged sections 126 together are slightly smaller than the diameter of hole 106. In embodiments, the diameter of the base portion 120 in maximum diameters of the winged sections 126 may be ⅛ to 1/16 inch smaller than the diameter of the hole 106, though the difference in the hole 106 diameter and the SSD diameter may be smaller or larger than that range in further embodiments.

Figure 7:
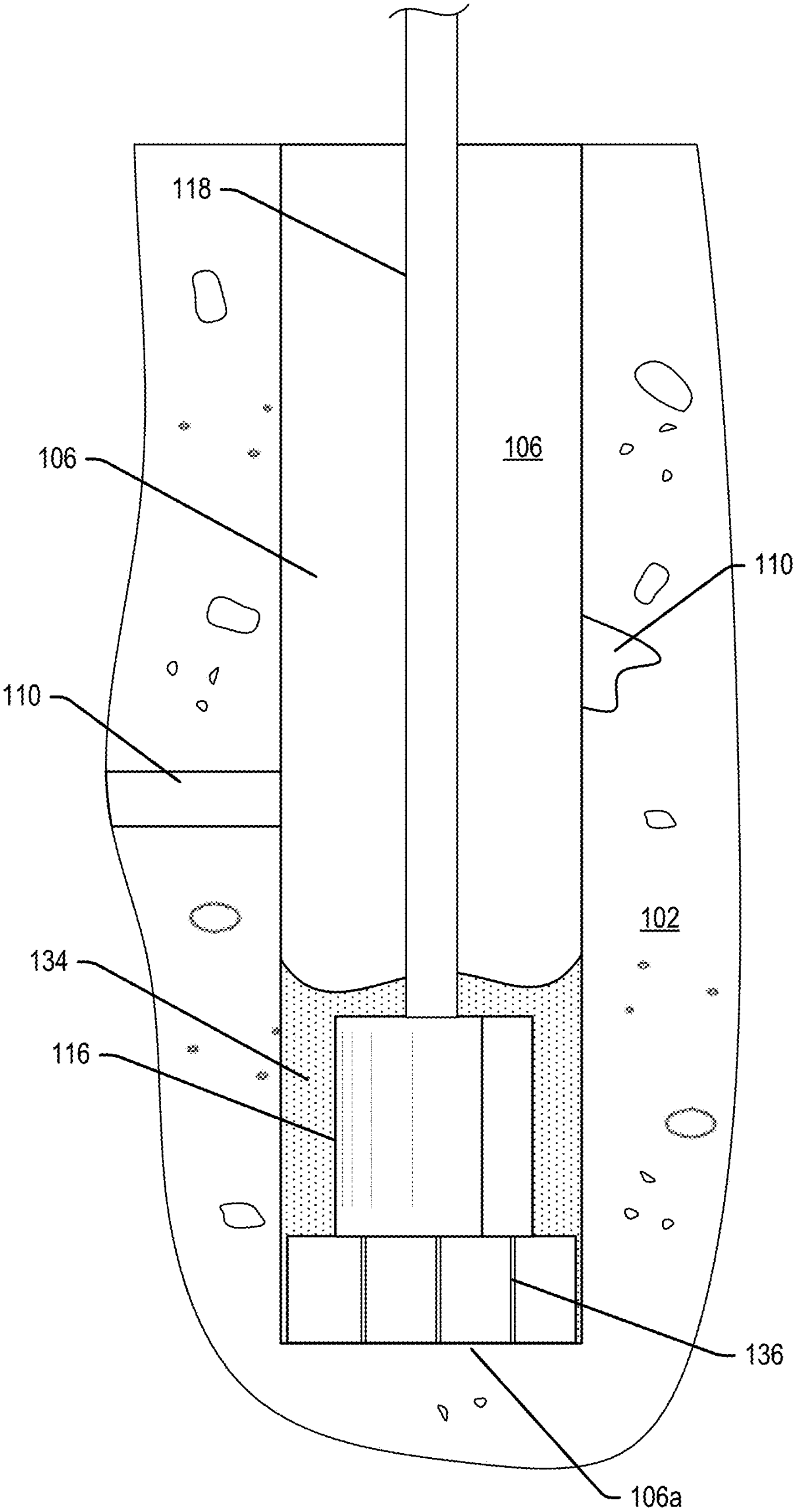

As shown in FIG. 7, the SSD 116 is pushed down to the base 106*a* of hole 106. The base section 120 of SSD 116 may include axial channels 136 which allows the base section 120 to push down through the sealant 134, with the sealant moving above the base section 120 through channels 136 and around the outer diameter of base section 120. Once the SSD 116 pushes through the sealant 134, the sealant 134 is stored in the reservoirs 130 at the top section 122 of SSD 116 and (possibly) the space above the SSD 116.

Figure 8:
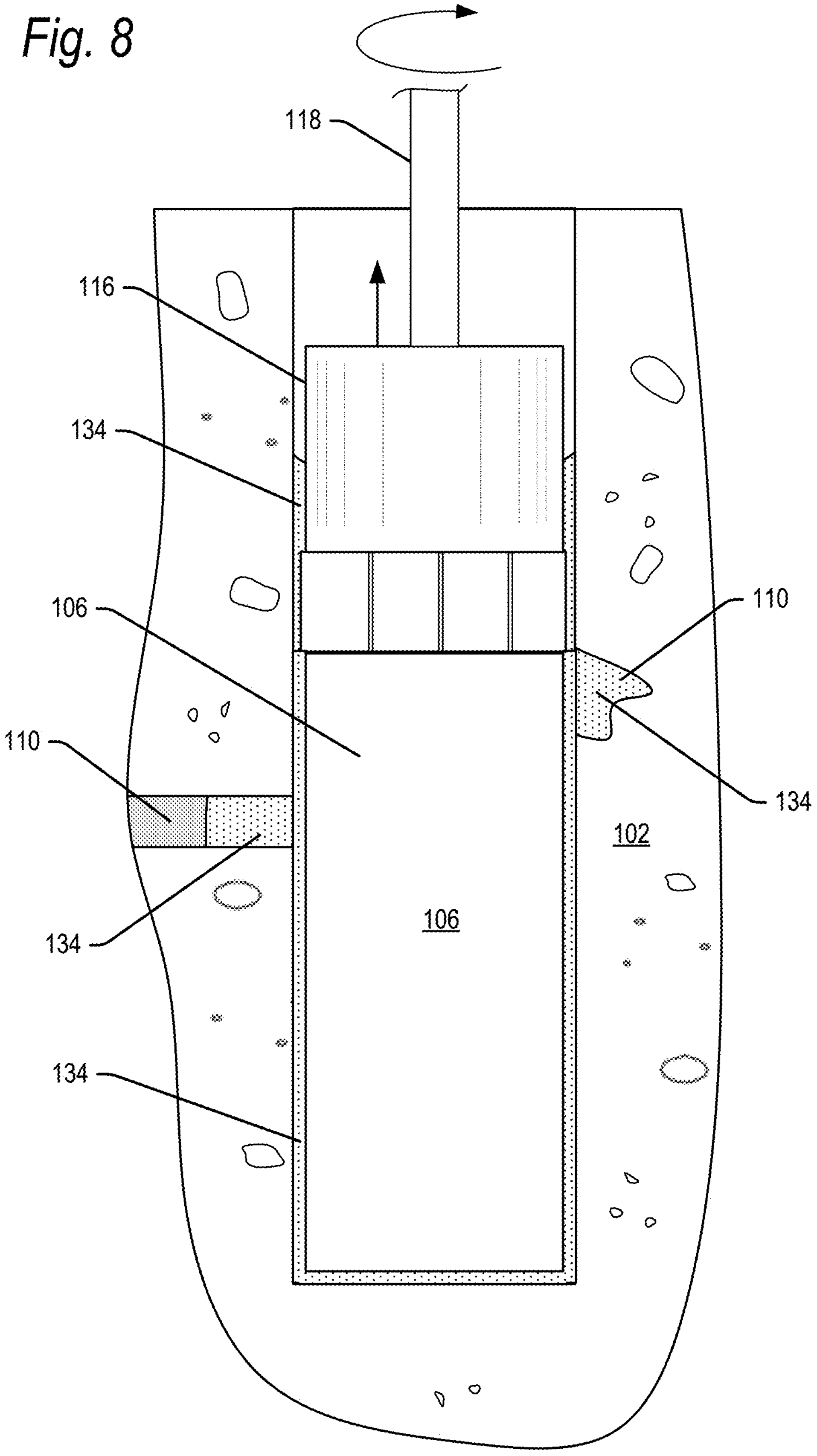
Figure 9:
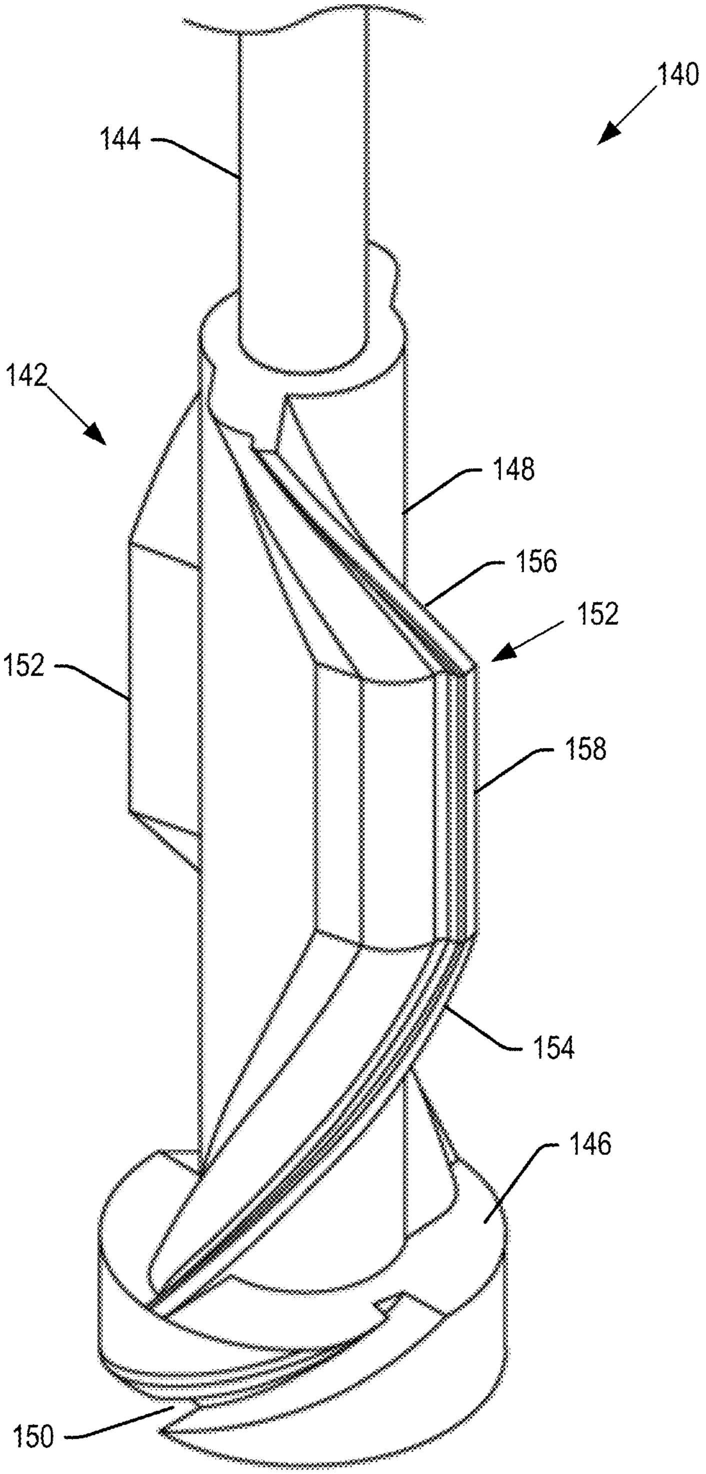
FIG. 9 is a perspective view of a sealant spreader assembly according to alternative embodiments of the present technology.
Figure 11:
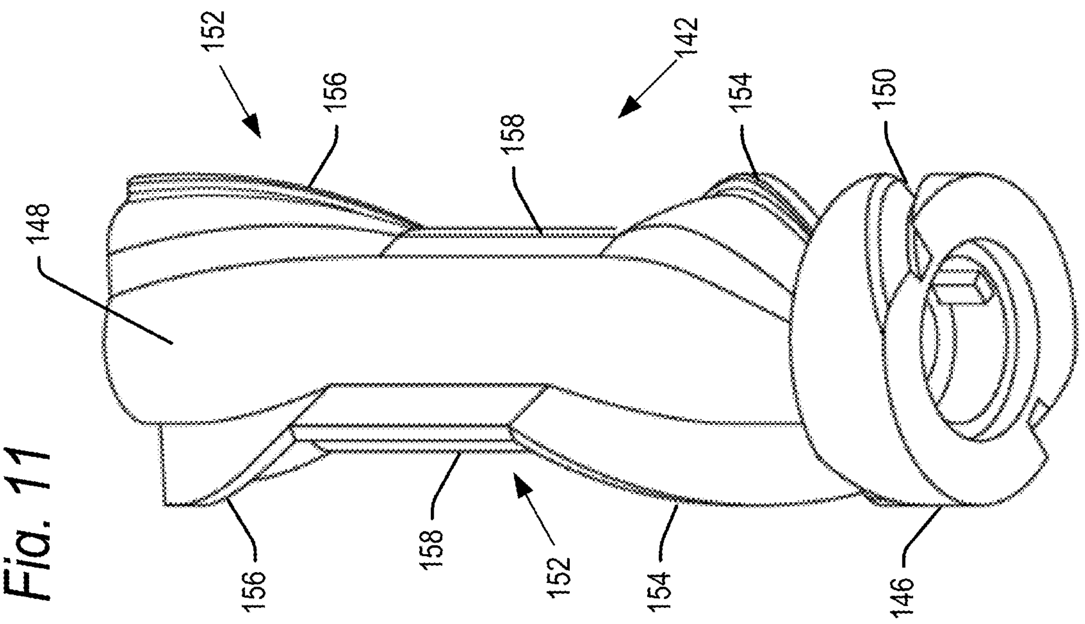
FIGS. 10 and 11 are different perspective views of a sealant spreader device according to the embodiment of FIG. 9.
Figure 10:
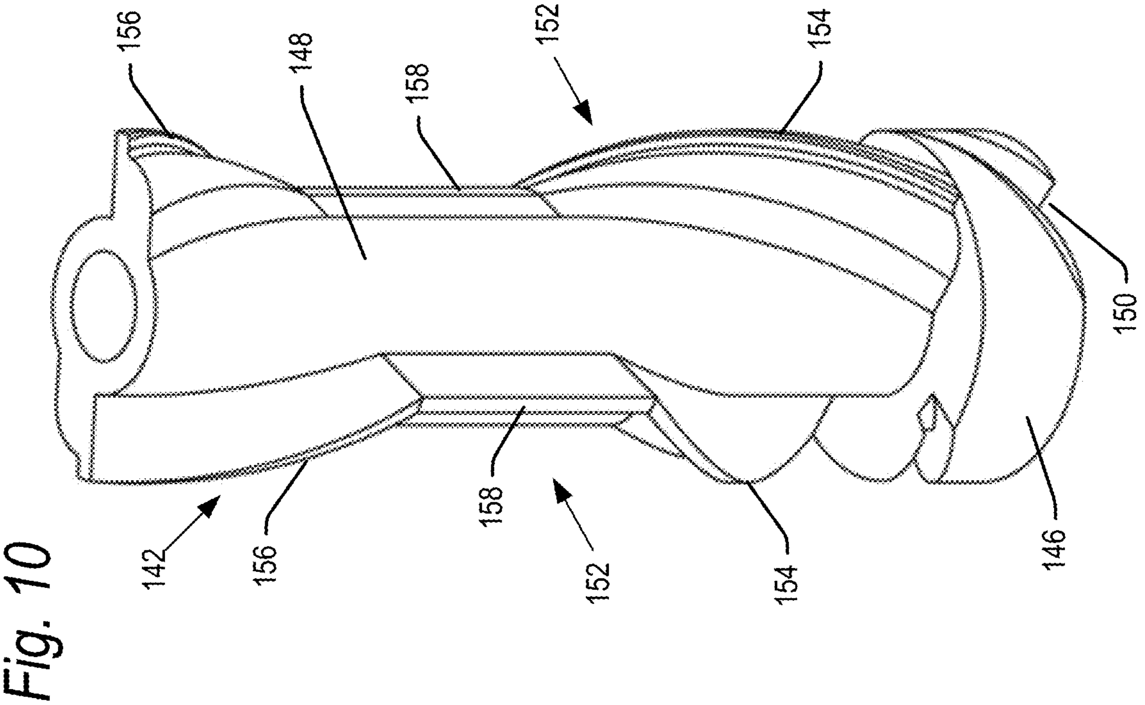

As shown in FIG. 8, the SSD 116 may next be rotated as it is pulled upward toward the mouth of hole 106. As it rotates, the variable radius winged sections 126 will force sealant from the reservoirs 130 outward against the circumference of hole 106 and into any voids 110, leaving behind a thin layer of sealant 134 along the entire cylindrical surface of hole 106. The voids 110 may be sealed and the thin layer of sealant 134 applied along the surface of hole 106 after a single pass of the SSD 116 from the base 106*a* of hole 106 to the opposite open end of hole 106. In further embodiments, the voids 110 may be sealed in a thin layer sealant 106 applied along the surface of hole 106 after multiple passes of the SSD along the length of hole 106.

The SSD 116 and sealant 134 may form an airtight seal preventing air from backfilling the hole 106 beneath the SSD 116 as the SSD 116 is pulled upward. As a result, a vacuum can form beneath the SSD 116 as the SSD 116 is pulled upward. This vacuum may disadvantageously cause sealant 134 to be pulled into this vacuum, seeping through channels 136 and/or around an outer circumference of the base section 120 of SSD 116.

This problem (and others) are addressed by further embodiments of the present technology, one of which will now be described with reference to FIGS. 9-16. Referring initially to FIGS. 9-13, a sealant spreader assembly 140 is shown, including a sealant spreader device 142 affixed to a first end of a rod 144. As above, a device such as a drill or manual instrument (not shown) may be removably affixed to the second end of rod 144 to rotate the SSD 142 and rod 144.

The sealant spreader device 142 of this embodiment includes a base portion 146 and a top portion 148. The base portion 146 includes relief slots 150, the purpose of which is explained below. The top portion includes a pair of winged sections 152 oriented 180° from each other. Each winged section 152 includes upwardly biasing blades 154 directly adjacent the base portion 146, downwardly biasing blades 156 at a top of each winged section 152, and neutral blades 158. The purpose of these blades will be explained below.

Figure 12:
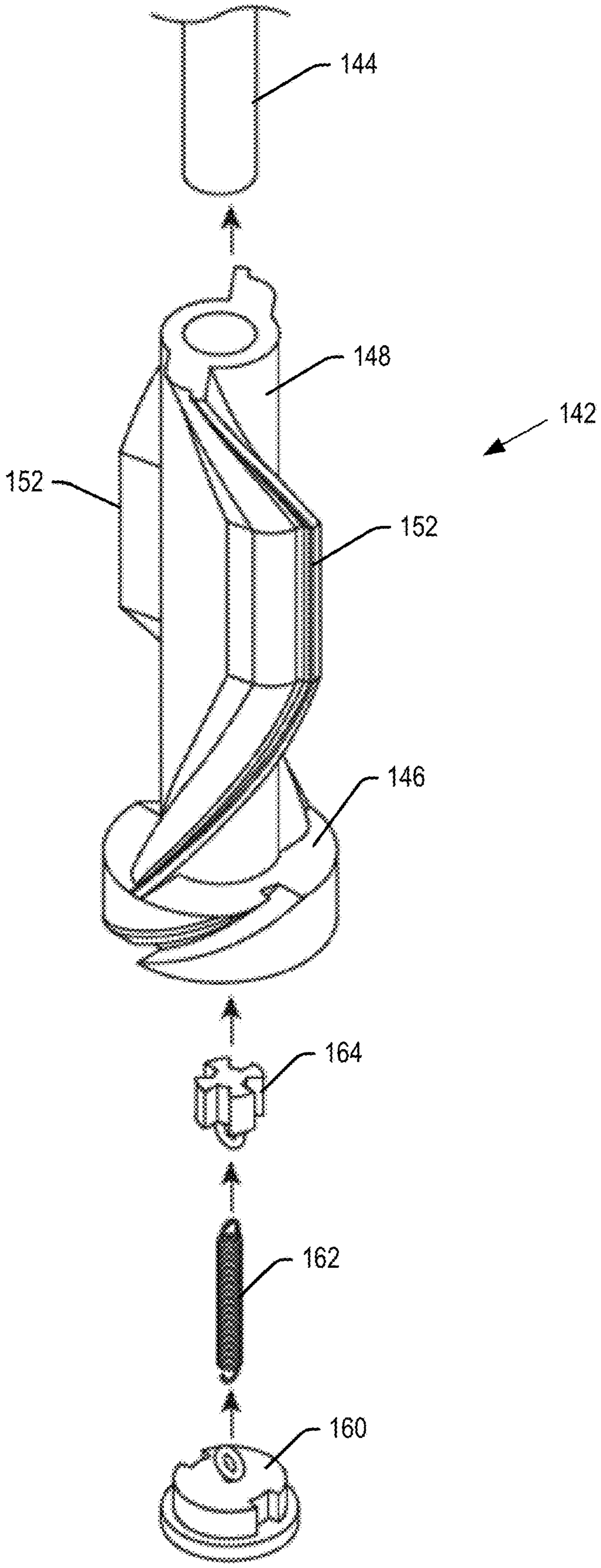
FIG. 12 is an exploded perspective view of a sealant spreader device according to the embodiment of FIG. 9.
Figure 13:
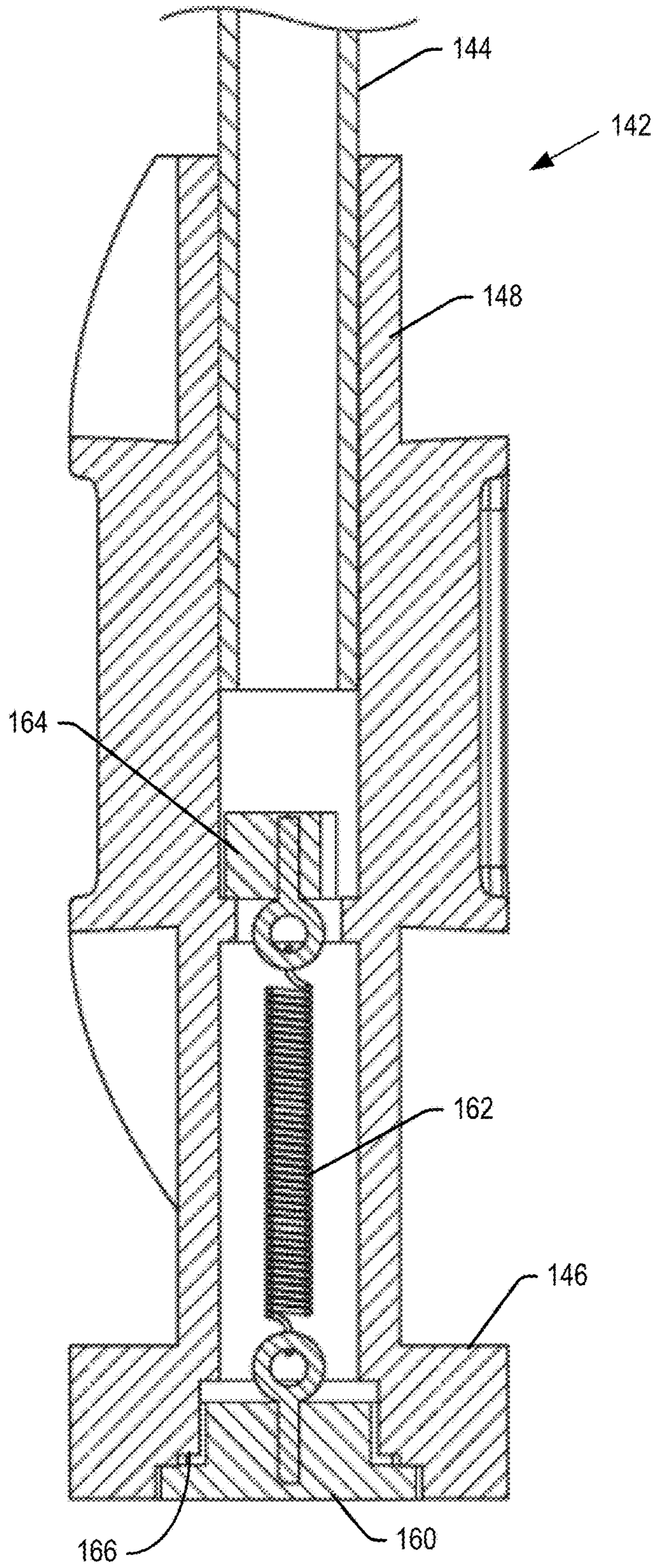
FIG. 13 is a cross-sectional view of a sealant spreader device according to the embodiment of FIG. 9.

As shown for example in the exploded perspective view and cross-sectional view of FIGS. 12 and 13, respectively, the SSD 142 further includes a pressure relief valve for preventing a vacuum below the SSD 142 as the SSD 142 is pulled upward out of hole 106. In particular, a valve cap 160 is positioned within the base portion 146, which valve cap 160 is connected by a spring 162 to a mount 164 within a body of the SSD 142. The spring 162 is preloaded with a force sufficient to hold the valve cap in a valve cup 166 at the bottom of the base portion 146 in the absence of other forces on the valve cap 160. Given the preloading of the spring 162, the valve cap 160 remains seated in the valve cup 166 when the SSD 142 is being pushed downward through the sealant 134 as previously explained and as explained further below. This prevents sealant from entering into the SSD 142 around the valve cap 160 as the SSD 142 pushes downward through the sealant 134.

However, when the SSD 142 is being pulled upward as previously explained and as explained further below, at some point the vacuum below the SSD 142 becomes sufficiently large that the pressure gradient above and below valve cap 160 generates a force on the valve cap exceeding the spring force holding the valve cap 160 in the valve cup. In this embodiment, the rod 144 and the interior of the SSD 142 may be hollow, so that the pressure above the valve cap is ambient pressure.

The force applied to the spring 162 by the valve cap 160 is the product of the ambient outside air pressure coming through the hollow tube and through the hollow body of the SD, and the inside surface area of the valve cap 160. As an example, the inside diameter of the valve cap may be 0.625 in., providing a surface area of the round valve cap of 0.3068 sq. in. If the ambient air pressure is 14.2 psi, then the force due to air pressure above the valve cap 160 (the product of the pressure and the area) is 4.4 lb. The force on the bottom side of the valve cap is 0.0 lbs. due to the vacuum.

Therefore, a spring with a pretension of less than 4.4 lbs. (and with a mild spring constant so that it does not resist significantly more load as it is stretched) will extend under 4.4 lbs. of load (resulting from the pressure differential) and create a gap between the valve cap 160 and the body of the SSD 142. This gap will let air in behind the SSD 142 as it is being withdrawn, relieving the vacuum effect. In embodiments, the spring may be preloaded with a smaller force, such as for example 0.4 lbs., and a spring constant of 2.8 lbs./in., ensuring that the valve cap 160 will easily open as the SSD 142 is withdrawn from the hole 106. It is understood that the preload on the spring 162 may vary outside of the above range, and the spring constant may be different, in further embodiments.

In embodiments, the valve cap 160 may have two tabs (or female slots) which engage with slots (or tabs) on the valve cup 166 to prevent rotation of the valve cap 160. This prevents winding/unwinding of the spring 162 which could otherwise alter the spring preload force. The tabs/slots may be omitted in further embodiments.

Figure 14:
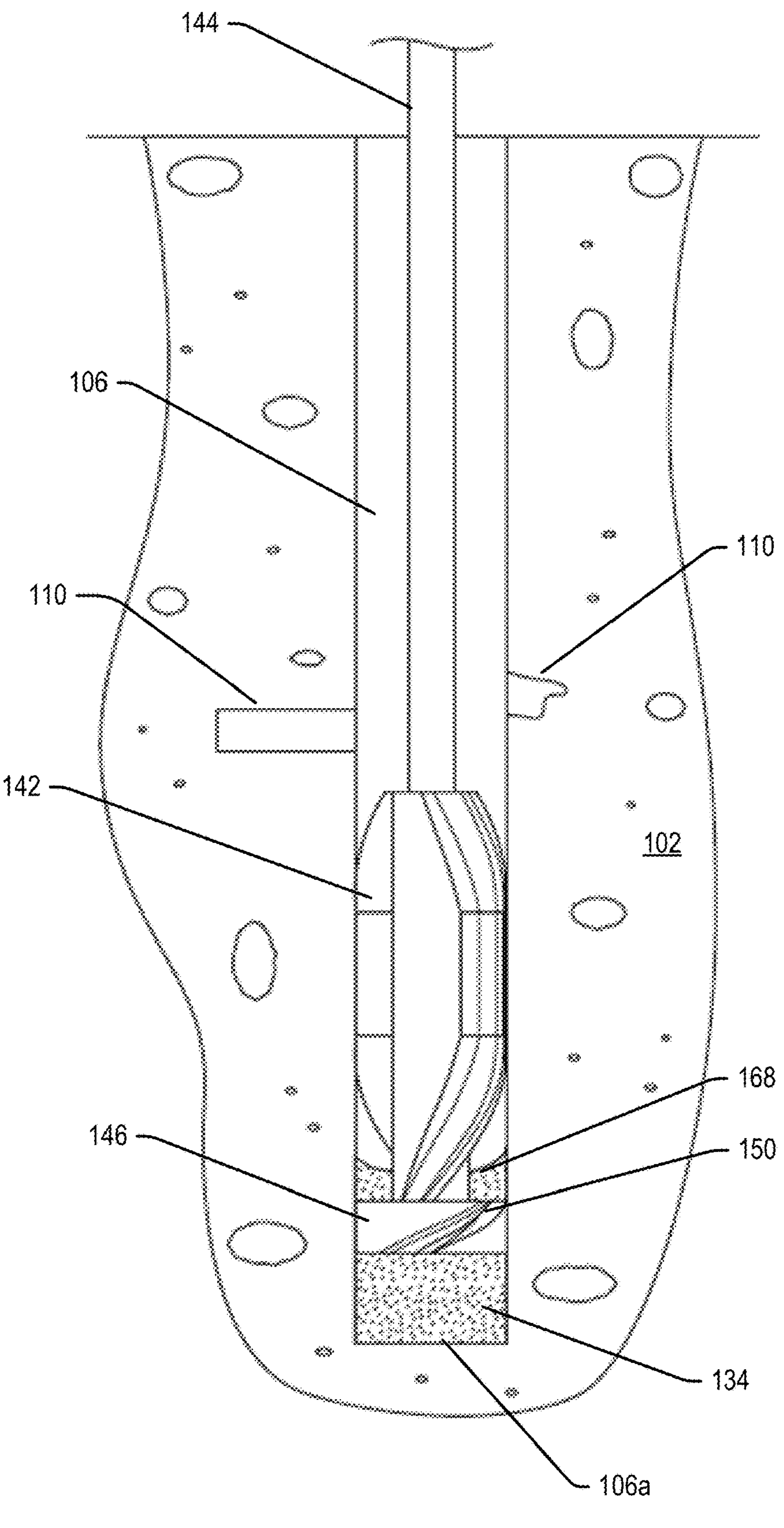
FIGS. 14-16 are views of the sealant spreader of FIG. 9 being inserted into and removed from a hole according to embodiments of the present technology.
Figure 15:
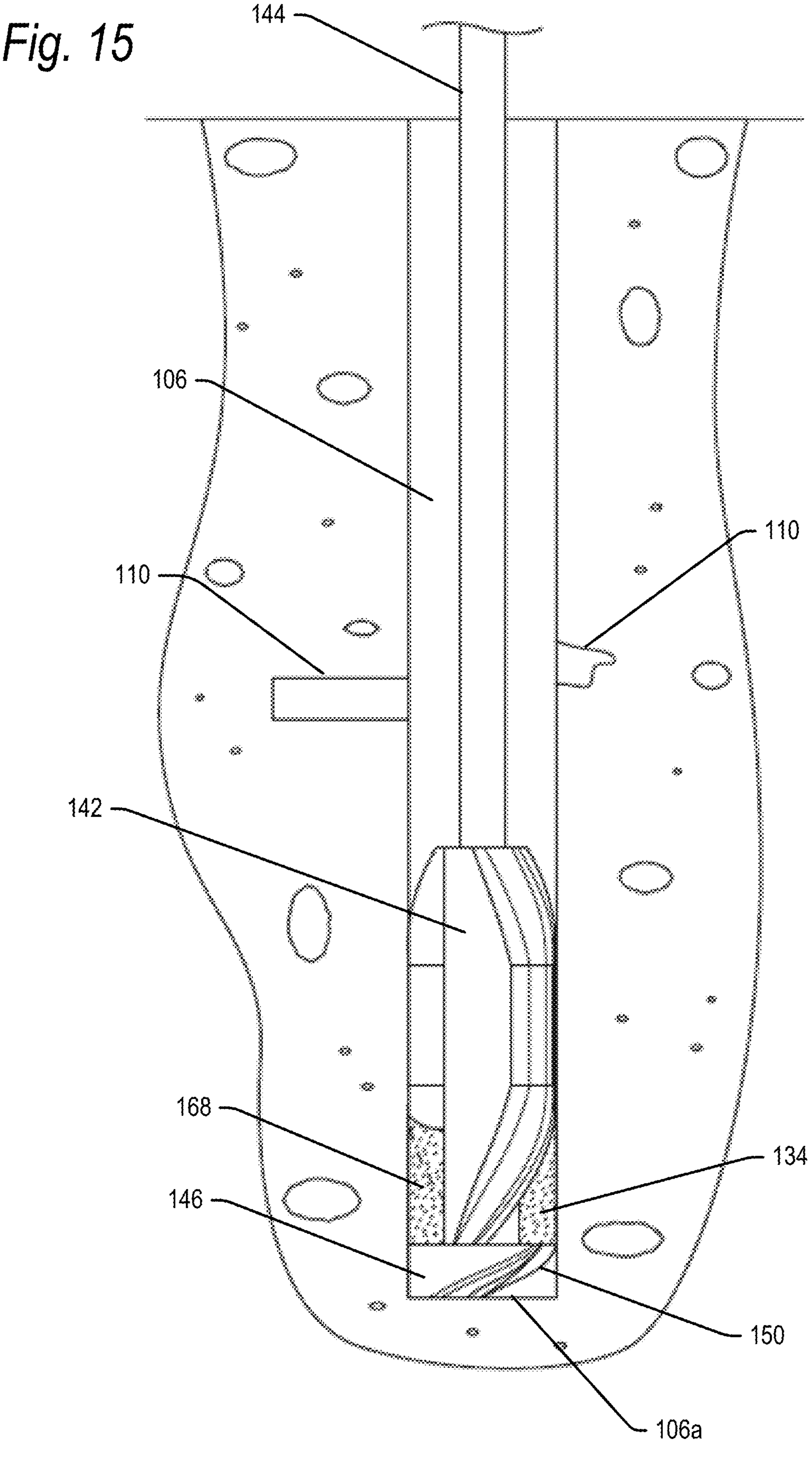

Referring now to FIG. 14, in this embodiment, the sealant 134 is initially supplied to a base 106*a* of the drilled hole 106 as described above. Once the sealant 134 is in the base 106*a* of hole 106, the SSD 142 may be inserted to the base 106*a* of the hole 106 (FIG. 15). As above, the diameter of SSD 142 may be customized to be just slightly smaller than the diameter of hole 106. The base portion 146 may include channels 136 as described above, and/or relief slots 150 described below, which allow the SSD 142 to move to the base 106*a*, displacing the sealant 136 into reservoirs 168 above the base portion 146.

Figure 16:
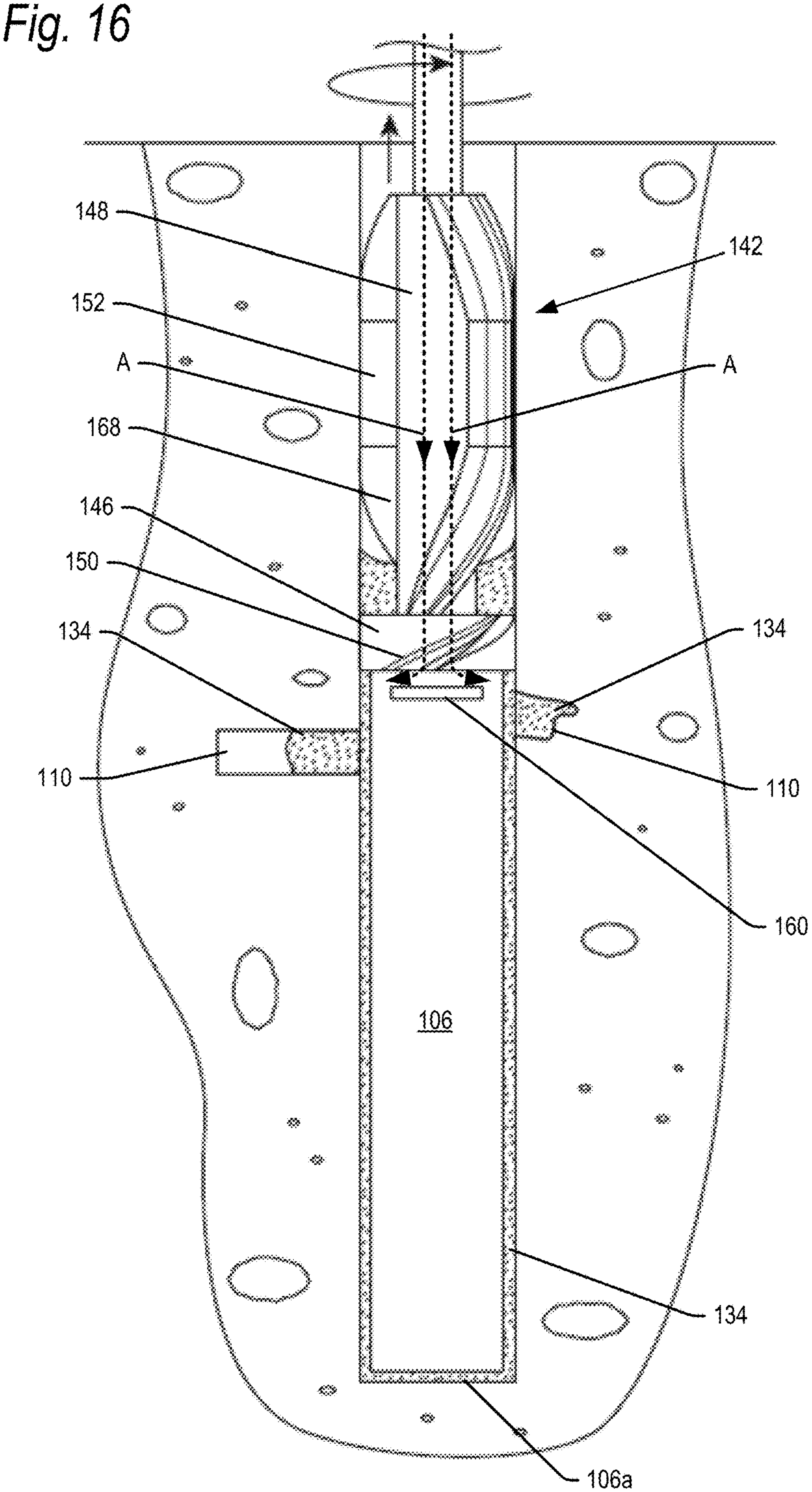

As shown in FIG. 16, the SSD 142 may next be rotated as it is pulled upward toward the mouth of hole 106. As it rotates, the winged sections 152 force the sealant 134 into any voids 110 open to the hole 106, and leaving behind a thin layer of sealant 134 along the entire cylindrical surface of hole 106. The top portion 148 including winged sections 152 may be about 4 inches long. This length may be greater than the length of top portion 122 of the embodiment shown in FIGS. 3-5. This elongated top portion 148 has a few advantages. First, it allows the winged sections 152 to each have differently oriented portions. Each winged section 152 includes upwardly biasing blades 154 directly adjacent the base portion 146, downwardly biasing blades 156 at a top of each winged section 152, and neutral blades 158 (numbered in FIGS. 10 and 11).

The upwardly biasing blades 154 are angled in a first direction as the wrap around a central hub of the top portion 148. Upon proper rotation of the sealant spreader assembly 140 (i.e., clockwise when looking down from the top), the angled contour of the upwardly biasing blades 154 bias the sealant 134 upwards toward the neutral blades 158 in the axial middle of the winged sections 152. The downwardly biasing blades 156 are angled in a second direction, opposite that of the upwardly biasing blades, as downwardly biasing blades 156 wrap around the central hub of the top portion 148. The angled contour of the downwardly biasing blades 156 bias the sealant 134 downward toward the neutral blades 158 in the axial middle of the winged sections 152. The sealant 136 is forced outward by the neutral blades 158, for example into voids 110. Given the upward bias of blades 154 and the downward bias of blades 156, the sealant is concentrated at the neutral blades 158, thus increasing the force with which the sealant may be forced into voids 110. Thus, the shape of these blades is optimally effective in forcing the sealant 134 into voids 110.

In embodiments, the upwardly biasing blades 154 are longer than the downwardly biasing blades 156 so that the net axial force (parallel to the central axis of rotation of SSD 142) of the winged sections 152 on the sealant is upward toward the mouth of hole 106. This keeps the sealant moving into voids and upward as the SSD 142 rotates and moves upward, thus further ensuring that only a thin layer of sealant is left lining the hole 106.

The pair of winged sections 152 also define the pair of reservoirs 168 in the spaces above the base portion 146 between the winged sections 152. A further benefit of the long length of the top portion 148 is that it provides reservoirs capable of holding large amounts of the sealant 134 as the SSD 142 rotates and moves upward.

As shown in FIG. 16, at some point during the upward movement of the SSD 142 the pressure differential above and below the valve cap 160 will become sufficiently large to overcome the force of the spring 162 holding within its seat in base portion 146. At this point, air from outside the sealant spreading assembly 140 will travel in the direction of arrows A, through the rod 144, through a central cavity in the SSD 142 and into the hole 106 beneath the SSD 142 to equalize the pressure across the SSD 142 and prevent sealant from being pulled back beneath the SSD 142.

As noted above, the base portion 146 includes relief slots 150. In embodiments, it may take multiple passes of the sealant spreader assembly 140 to properly remove the sealant leaving just a thin layer coating the hole 106 and sealing the voids 110. Upon reinsertion of the SSD 142 to the base 106*a* of the hole 106 for secondary (and further) passes, the SSD 142 would again create an airtight seal between the base portion 146 and surface of the hole due to sealant 134 on the SSD 142 after the previous pass and the sealant 134 on the walls of the hole 106 from the previous pass. This sealing effect will thus compress the column of air inside the hole 106 upon reinsertion and pressing downward of the SSD 142 in the hole 106. This compressed air may push sealant 134 that was previously pushed into voids 110 even deeper into those voids, potentially exposing new voids that are not sealed, lessening the effectiveness of sealing the voids of the previous pass.

To overcome this problem, the base portion 146 may include relief slots 150. Upon reinsertion of the SSD 142, the relief slots 150 may remain free of sealant 136, thus preventing pressure buildup beneath the SSD 142 as the SSD 142 is again pressed downward to the base 106*a* of hole 106.

In embodiments described above, the base portion 120, 146 may have a diameter that is at least as large as the maximum diameter of the winged sections of the top portion 122, 148. In a further embodiment, the SSD 142 may be similar to that described above with respect to FIGS. 9-16, except that the base portion is smaller. This embodiment will now be described with reference to FIGS. 17-22. In the following description, parts having the same reference numbers are structurally and operationally the same as that described above with respect to FIGS. 9-16.

Figure 17:
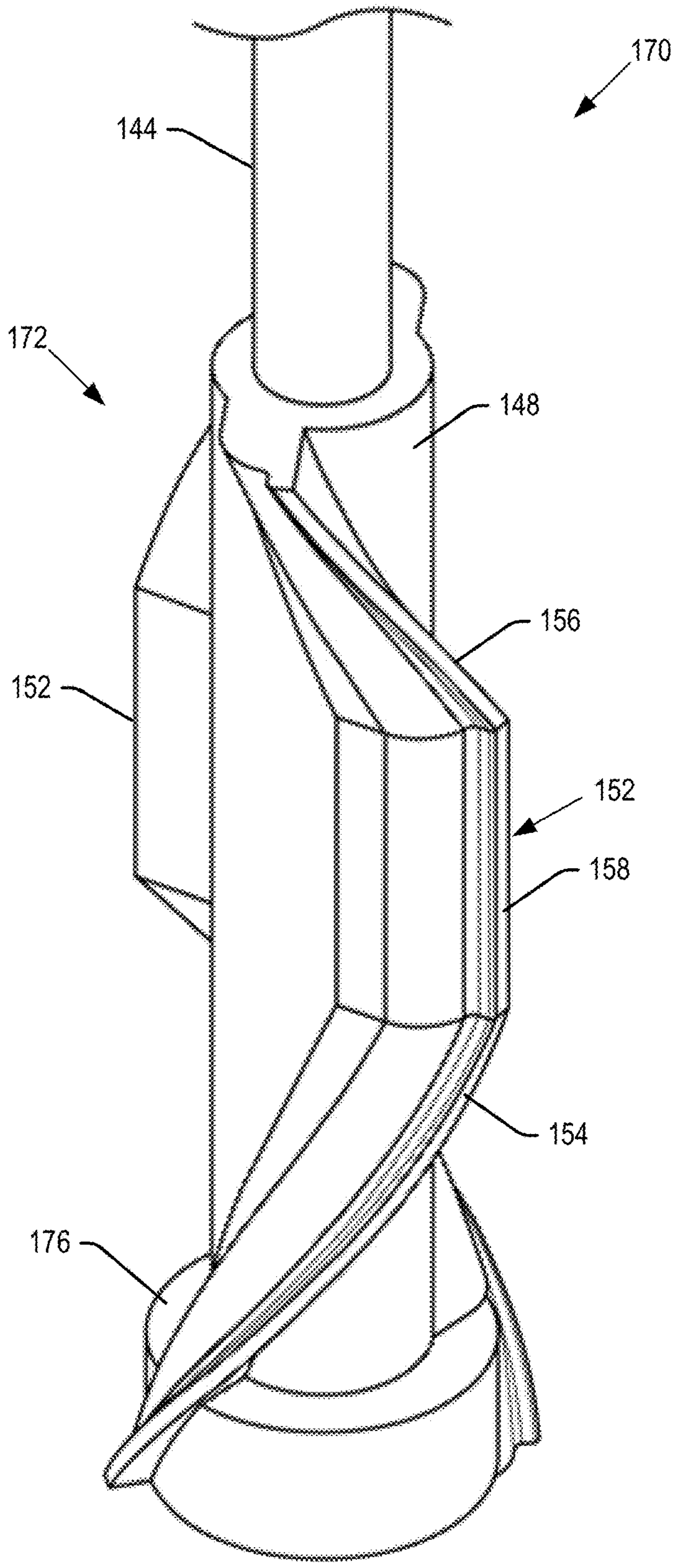
FIG. 17 is a perspective view of a sealant spreader assembly according to further alternative embodiments of the present technology.
Figure 19:
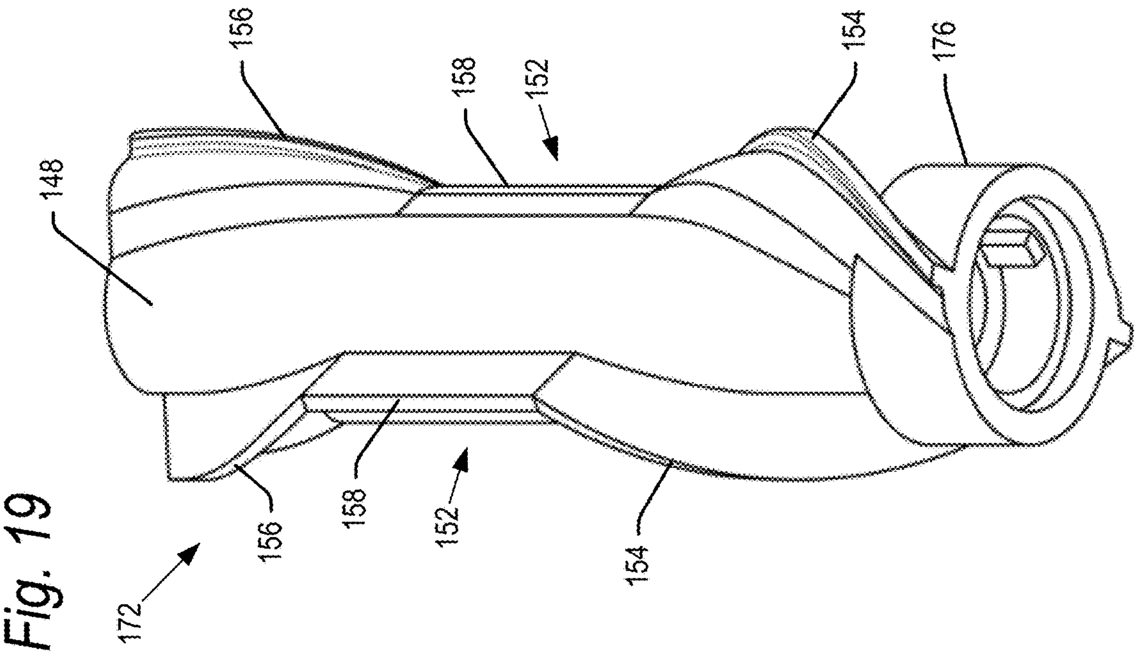
FIGS. 18 and 19 are different perspective views of a sealant spreader device according to the embodiment of FIG. 17.
Figure 18:
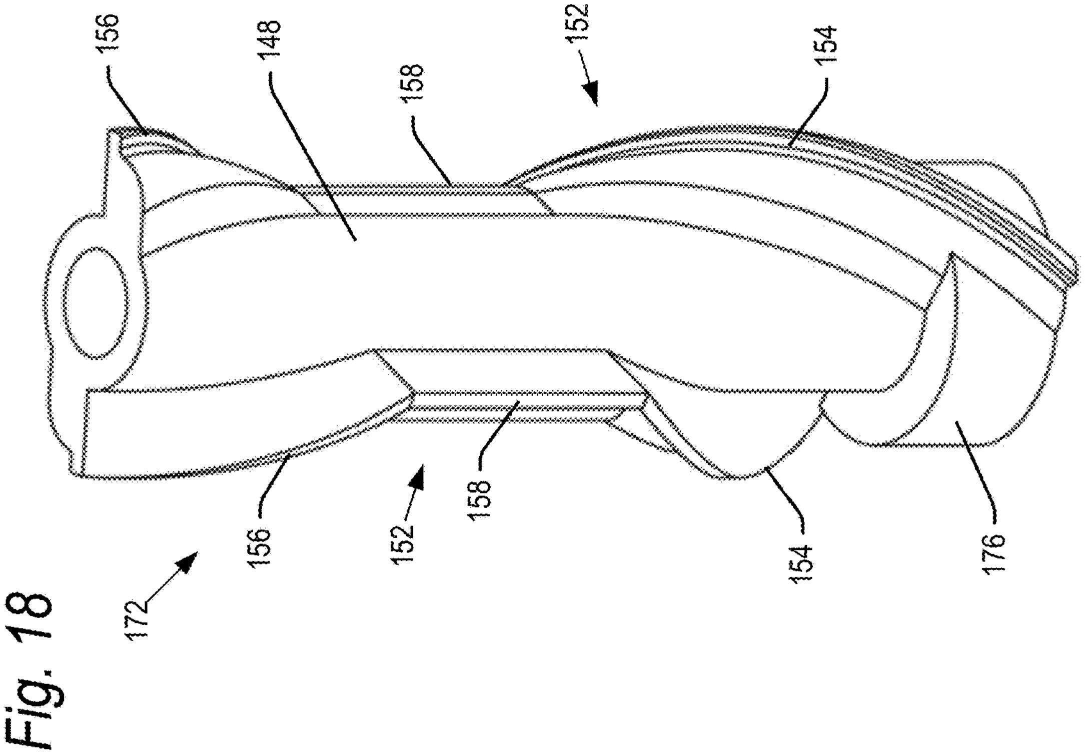

FIGS. 17-19 show a sealant spreader assembly 170, including a sealant spreader device 172 affixed to a first end of a hollow rod 144. The sealant spreader device 172 of this embodiment includes a base portion 176 and a top portion 148. The top portion 148 includes a pair of winged sections 152 oriented 180° from each other. Each winged section 152 includes upwardly biasing blades 154 directly adjacent the base portion 146, downwardly biasing blades 156 at a top of each winged section 152, and neutral blades 158 as described above.

The base portion 176 in this embodiment has a reduced diameter so as to be more narrow than the winged sections 152 of the top portion 148. The winged sections 152 together have a diameter which is just smaller than the diameter of hole 106 as described above, but the diameter of base portion 176 is smaller, leaving for example ¼ inch between the outer diameter of the base portion 176 and the walls of hole 106. It is understood that the space between the base portion 176 and the walls of hole 106 may be greater or lesser than that in further embodiments.

Figure 20:
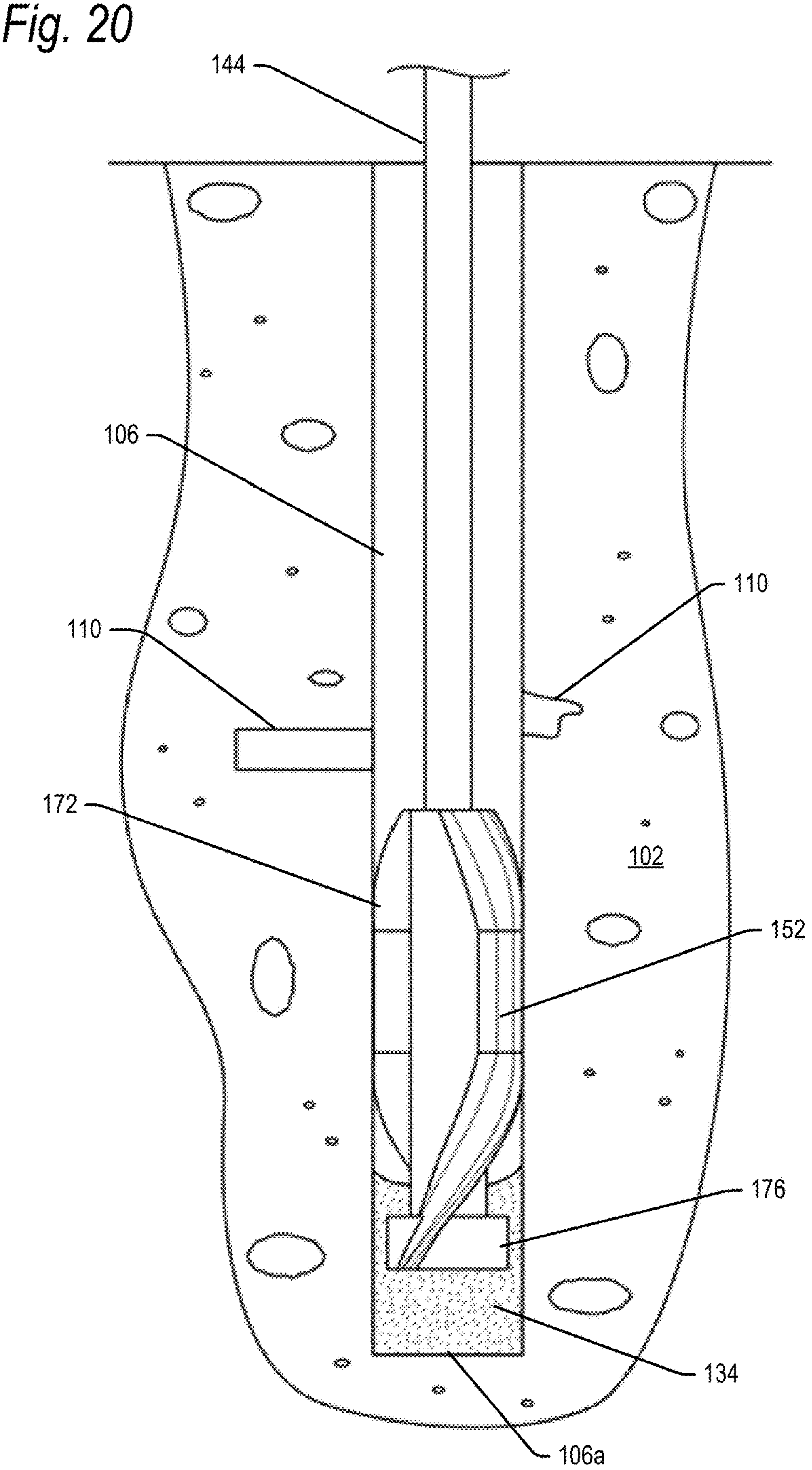
FIGS. 20-22 are views of the sealant spreader of FIG. 17 being inserted into and removed from a hole according to embodiments of the present technology.
Figure 21:
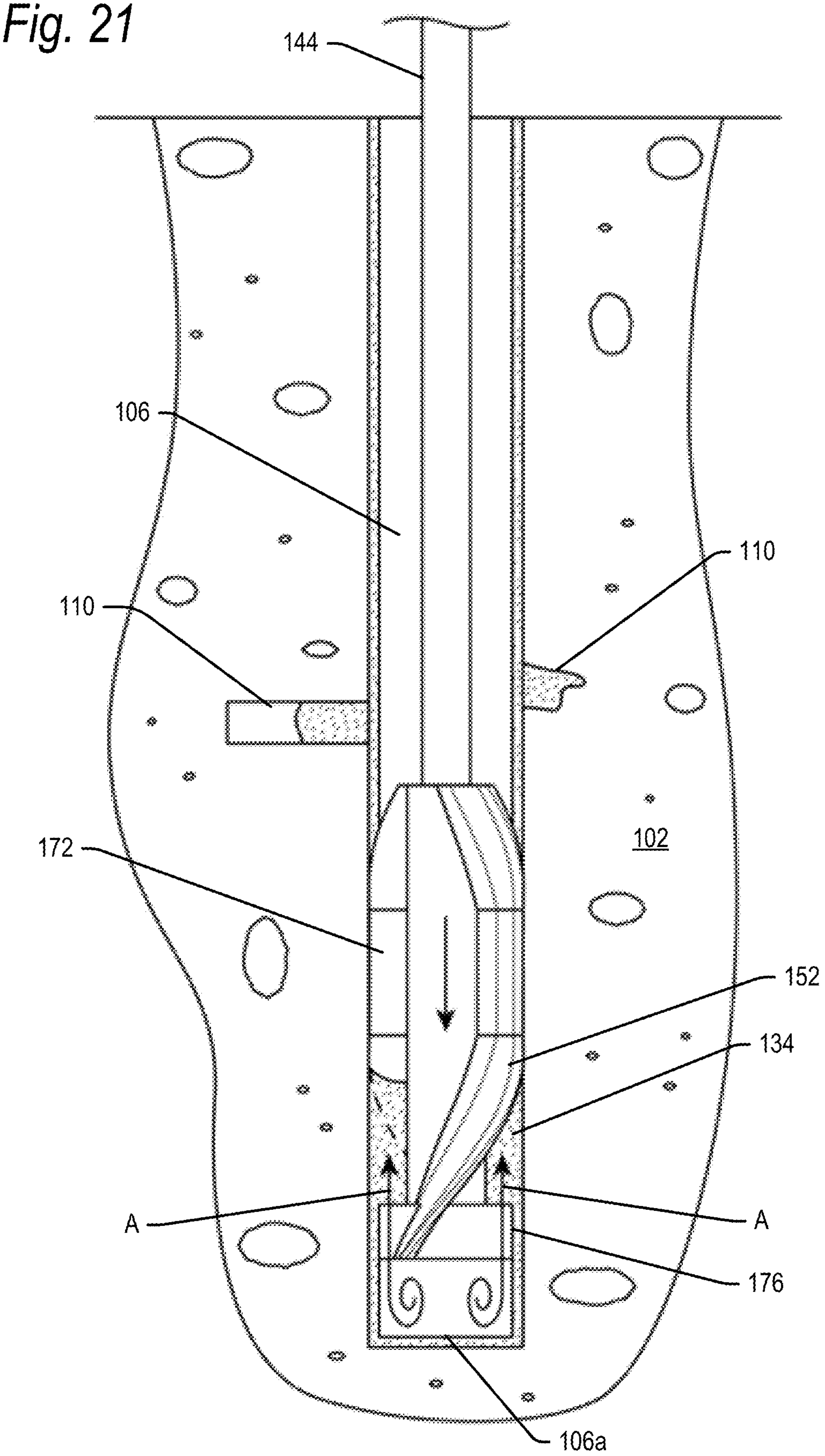
Figure 22:
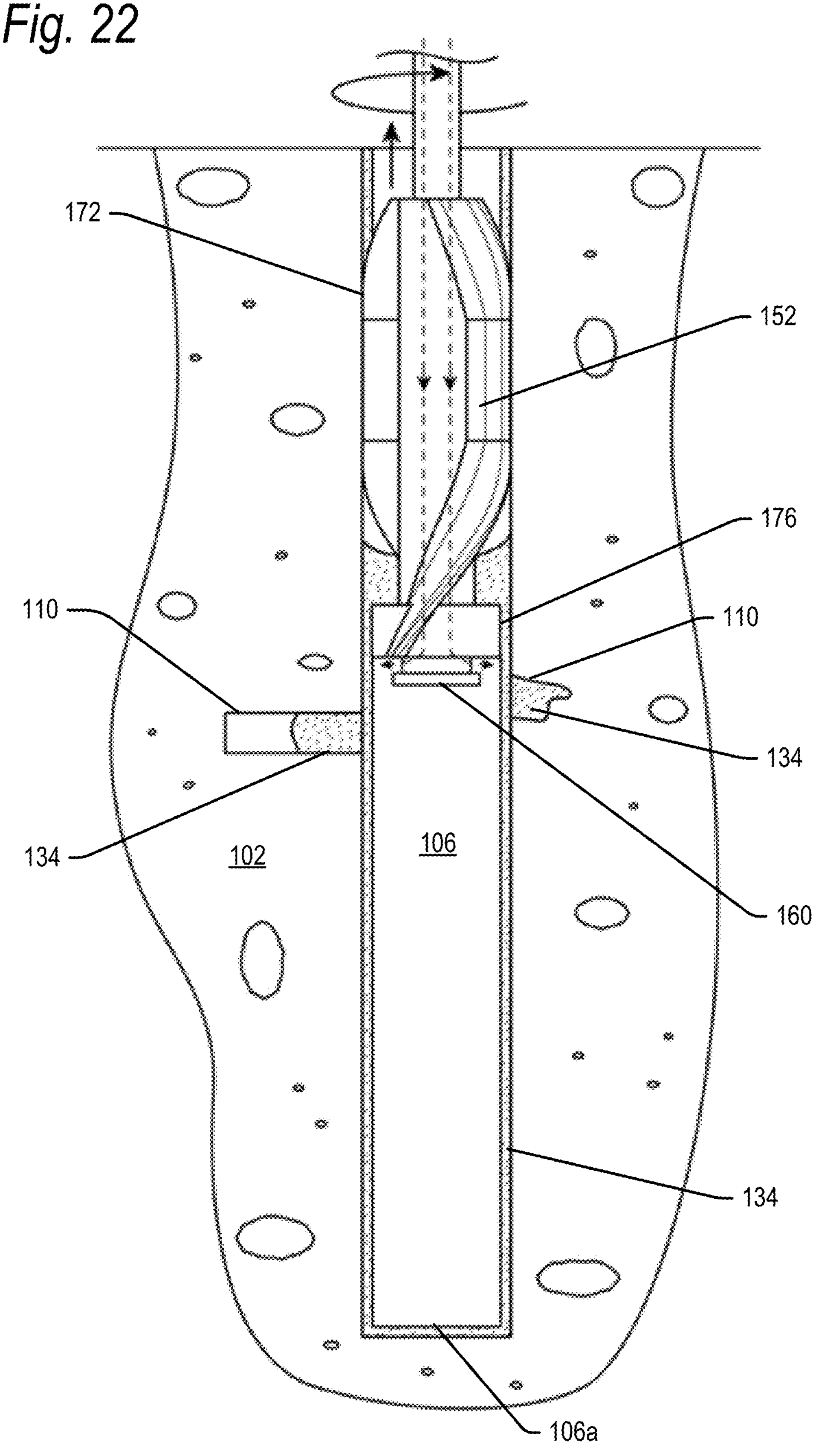

As noted, it may take more than one pass of the sealant spreader device within the hole 106 to effectively seal all voids 110 and leave a thin layer of sealant 134 coating the hole 106. The reduced diameter of the base portion 176 has the effect that, upon reinsertion of the SSD 172, a seal is not created between the walls of hole 106 and the SSD 172 at base portion 176. This allows air to escape upward (arrows A) from beneath the SSD 172 as the SSD 172 is pushed downward upon reinsertion (FIGS. 20 and 21). Because the outside diameter of the base portion 176 is no longer the same as the outside diameter of the winged sections 152, the winged sections 152 are wholly responsible for moving excess sealant upward toward the mouth of the hole as the SSD is withdrawn. As an airtight seal may be formed at the SSD 172 as the SSD 172 moves sealant upward, a relief valve 160 and associated components may be provided as shown in FIG. 22 and as described above to prevent a vacuum beneath the SSD 172 with the upward travel of the SSD 172.

After the hole 106 is prepared by applying the sealant 134 into the voids and leaving a thin layer of sealant on the walls of the hole 106, the sealant may be cured or otherwise hardened. Thereafter the rod 104 (FIG. 1) may be glued into hole 106 using a glue or other adhesive. In further embodiments, the glue or other adhesive may be applied before the sealant 134 is cured. In such embodiments, the sealant 134 may be more viscous than the glue or other adhesive that is used to secure the rod 104 in the hole 106. In such embodiments, the sealant 134 and the glue or other adhesive may be cured at the same time.

The various SSDs 142, 172 have been described above as having a pair of winged sections 152. However, it is understood that an SSD 142, 172 may have a single winged section 152, or more than two winged sections, about a circumference of the SSD, including for example three or four winged sections 152.

In summary, the present technology relates to a sealant spreader device for spreading a sealant into one or more voids surrounding a hole configured to receive a glued-in-rod, the sealant spreader device comprising: a base portion configured to fit in the hole, and a top portion formed on the base portion and configured to fit in the hole, the top portion including winged sections configured to force the sealant into the one or more voids as the base portion and top portion are rotated and lifted out of the hole.

In a further example, the present technology relates to a sealant spreader device for spreading a sealant into one or more voids surrounding a hole configured to receive a glued-in-rod, the sealant spreader device comprising: a base portion configured to fit within the hole, and a top portion formed on the base portion and configured to fit within the hole, the top portion comprising: a reservoir configured to store an amount of the sealant; a winged section having one or more contours configured to force the sealant from the reservoir radially outward into the one or more voids as the sealant spreader device rotates.

In another embodiment, the present technology relates to a method of sealing one or more voids surrounding a hole configured to receive a glued-in-rod, the method comprising: (a) supplying an amount of sealant to a base of the hole; (b) inserting a sealant spreader device into the hole, through the sealant, to the base of the hole, the sealant spreader comprising winged sections with a contour configured to move sealant radially outward toward walls of the hole upon rotation; (c) rotating the sealant spreader while lifting the sealant spreader out of the hole to force sealant radially outward toward the walls of the hole and into the one or more voids; and (d) carrying sealant upward with the sealant spreader as the sealant spreader rotates and is lifted out of the hole.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A sealant spreader device for spreading a sealant into one or more voids surrounding a hole made to receive a glued-in-rod, the sealant spreader device comprising:

a base portion specifically made to fit in the hole, a top portion formed on the base portion and specifically made to fit in the hole, the top portion including one or more winged sections specifically made to force the sealant into the one or more voids as a result of the base portion and the top portion being rotated and lifted out of the hole; and a pressure valve seated within the base portion, the pressure valve opening to vent air into the hole below the sealant spreader device as the sealant spreader device is lifted out of the hole;

wherein the pressure valve is biased against the base portion within an interior cavity of the sealant spreader device.

2. The sealant spreader device of claim 1, wherein each winged section comprises a first portion having a first contour angled in a first direction configured to bias the sealant upward as the base portion and the top portion are rotated and lifted upward.

3. The sealant spreader device of claim 2, wherein each winged section further comprises a second portion having a second contour angled in a second direction opposed the first direction, the second portion configured to bias the sealant downward as the base portion and the top portion are rotated and lifted upward.

4. The sealant spreader device of claim 3, wherein each winged section further comprises a third portion between the first portion and the second portion, the first portion and the second portion concentrating the sealant in the third portion.

5. The sealant spreader device of claim 4, wherein the third portion forces the sealant into the one or more voids.

6. The sealant spreader device of claim 1, wherein the winged sections are positioned 180° from each other.

7. The sealant spreader device of claim 6, wherein an outer diameter of the base portion is less than an outer diameter of the two winged sections together, the smaller diameter base portion preventing an airtight seal of the sealant spreader device upon reinsertion of the sealant spreader device for a second pass of the sealant spreader device in the hole.

8. A sealant spreader device for spreading a sealant into one or more voids surrounding a hole configured to receive a glued-in-rod, the sealant spreader device comprising:

a base portion made to fit within the hole, and a top portion formed on the base portion and made to fit within the hole, the top portion comprising:

a reservoir made to store an amount of the sealant;

a winged section having one or more contours specifically made to force the sealant from the reservoir radially outward into the one or more voids as a result of the sealant spreader device rotating;

wherein the winged section comprises a first portion, the first portion being adjacent the base portion and having a first angled contour angled in a first direction, the first angled contour of the first portion configured to bias the sealant upward as the base portion and the top portion are rotated and lifted upward;

wherein the winged section comprises a second portion, the second portion being most distal from the base portion and having a second angled contour angled in a second direction opposite the first direction, the second angled contour of the second portion configured to bias the sealant downward as the base portion and the top portion are rotated and lifted upward;

wherein the winged section further comprises a third portion between the first portion and the second portion, the first portion and the second portion concentrating the sealant in the third portion and the third portion forcing the sealant radially outward into the one or more voids; and wherein the first portion is longer than the second portion, the length of the first portion resulting in a larger upward bias on the sealant from the first portion than the downward bias on the sealant from the second portion.

9. The sealant spreader device of claim 8, wherein a radius of the base portion is less than a radius of the winged section, the smaller radius of the base portion preventing an airtight seal of the sealant spreader device upon reinsertion of the sealant spreader device in the hole.

10. The sealant spreader device of claim 8, further comprising a pressure valve seated within the base portion, the pressure valve opening to vent air into the hole below the sealant spreader device as the sealant spreader device is lifted out of the hole.

11. The sealant spreader device of claim 10, wherein the pressure valve is biased against the base portion by a preloaded spring within an interior cavity of the sealant spreader device.

* * * * *